(12) United States Patent
Tamai et al.

(10) Patent No.: US 6,677,725 B2
(45) Date of Patent: Jan. 13, 2004

(54) POWER SOURCE SYSTEM FOR VEHICLE

(75) Inventors: Yasuhiro Tamai, Shizuoka-ken (JP);
Tetsuya Hasegawa, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 21 days.

(21) Appl. No.: 10/162,687

(22) Filed: Jun. 6, 2002

(65) Prior Publication Data

US 2002/0190690 A1 Dec. 19, 2002

(30) Foreign Application Priority Data

Jun. 14, 2001 (JP) .................................. P 2001-180079

(51) Int. Cl.$^7$ .............................................. H01M 10/46
(52) U.S. Cl. ...................................... 320/103; 320/116
(58) Field of Search ................................. 320/103, 104, 320/116, 118, 119, 123

(56) References Cited

U.S. PATENT DOCUMENTS 5,684,384 A * 11/1997 Barkat et al.
6,150,795 A * 11/2000 Kutkut et al.

FOREIGN PATENT DOCUMENTS

| JP | 10-164710 | 6/1998 |
|---|---|---|
| JP | 10-178703 | 6/1998 |

* cited by examiner

Primary Examiner—Edward H. Tso
(74) Attorney, Agent, or Firm—Finnegan, Henderson, Farabow, Garrett, & Dunner, L.L.P.

(57) ABSTRACT

A power source system for a vehicle includes a generator for producing a power. The system includes a first battery for being charged by the generator to supply a power of a first voltage to a first load. The system includes a second battery for supplying a power of a second voltage to a second load. The system includes a converter for receiving a power of the first voltage from the first battery to convert the power of the first voltage into a power of the second voltage to be supplied to the second battery. The system includes a controller for controlling output of the converter, in accordance with one of states of the generator, a charge of the first battery, the first load, a charge of the second battery, and the second load.

9 Claims, 4 Drawing Sheets

POWER SOURCE SYSTEM FOR VEHICLE

BACKGROUND OF THE INVENTION

1. Field of the Invention

The present invention relates to a power source system for a vehicle and, more specifically, to one which includes two systems with different voltages to be controlled.

2. Description of Relevant Art

Recently, an automotive is developed in progress, which is equipped with a motor generator in advantageous fuel costs. The automotive is operated with power sources of two systems which include a high voltage system (for example, 42 volt) and a lower voltage system (for example, 14 volt). This kind of automotive is equipped with a power source, which detects a speed of a vehicle to control the motor generator on the basis of the detection for improvement of fuel costs and for protection of a battery.

As an automotive operated with power sources of two systems, a serial-hybrid automotive is cited. The automotive employs a technology which adjusts an electric power generation in amount on the basis of a state of a vehicle.

Figure 4:
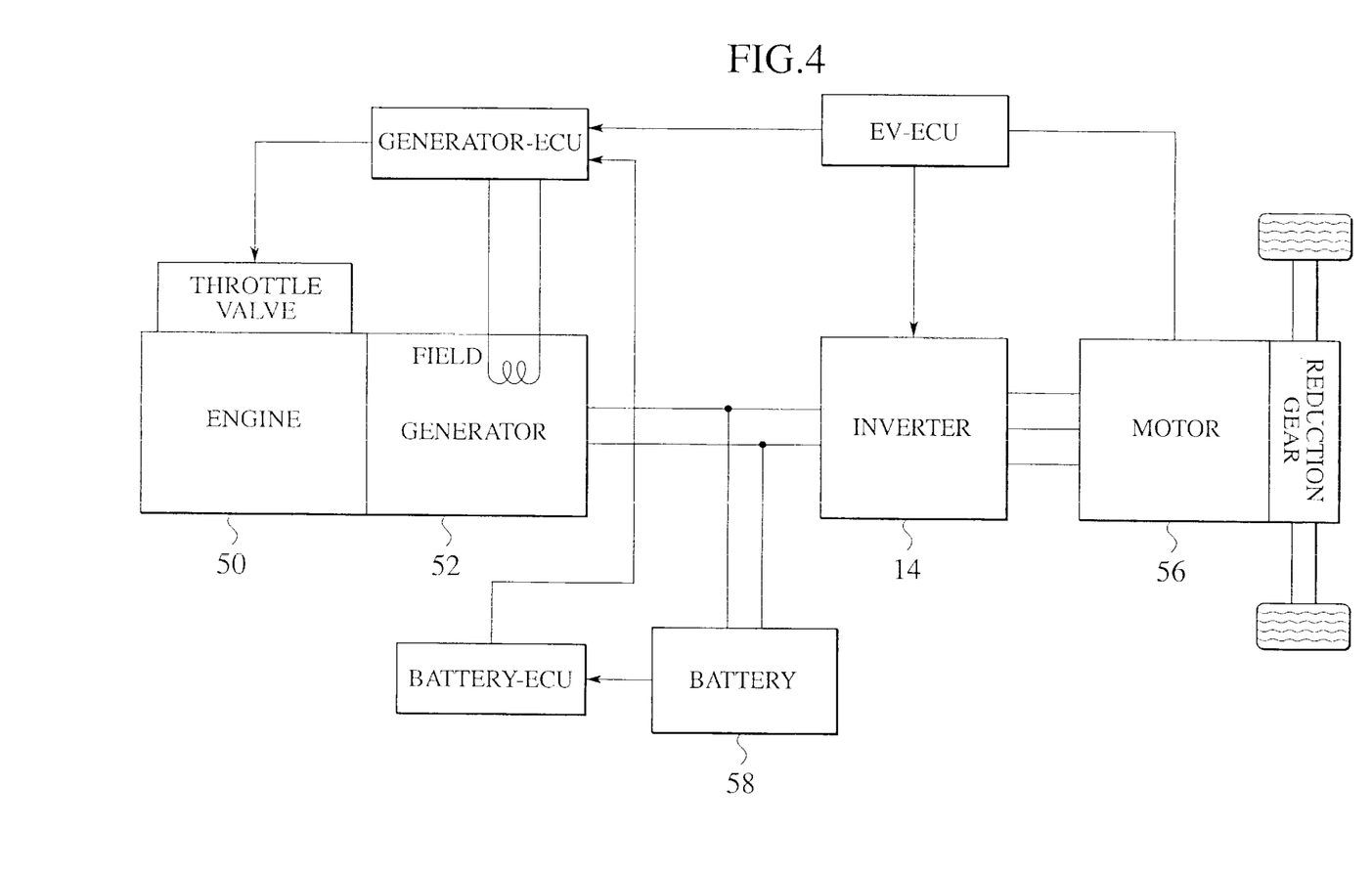
FIG. 4 is an illustrative block diagram of a vehicle with a conventional power source system.

For example, the Japanese Patent Application Laid-Open Publication of NO. 10-178703 discloses an "electric power generation controller for a hybrid type electric automotive". The controller, as shown in FIG. 4, includes a generator 52 to be driven by an engine 50. The controller includes a battery 58 for receiving a power from generator 52 to supply a power to motor 56. Based on the load of battery 58 and speed of a vehicle, generator 52 is determined on the upper limit (upper threshold) of electric power to be generated. Generator 52 is controlled to generate electric power within the upper limit.

The Japanese Patent Application Laid-Open Publication of NO. 10-164710 discloses an "electric power source controller for a hybrid type electric automotive". The controller is equipped with a battery and an engine electric power generator as a power source. When the battery is lowered in the residual capacity (charging rate), the generator produces an electric power.

SUMMARY OF THE INVENTION

These automotive include loads of a high voltage system as well as a conventional low voltage system. This needs converter to convert a high voltage into a low voltage. This voltage converter and the low voltage loads connected to each other are loads for the high voltage system in view of the motor generator and the higher voltage battery.

Loads in the low voltage system include a kind of lamp, with the electric power consumption which occupies a considerable ratio relative to a whole electric power consumption of an automotive. Thus, when conversion of power in the voltage converter has no relationship with control on the motor generator, improvement of fuel costs due to the control on the motor generator is reduced.

The invention is directed to a power source system for a vehicle, which allows control of a electric power generation in accordance with a vehicle under various conditions to improve fuel costs and to further effectively protect battery.

A first aspect of the invention provides a power source system for a vehicle. The system includes a generator for producing a power. The system includes a first battery for being charged by the generator to supply a power of a first voltage to a first load. The system includes a second battery for supplying a power of a second voltage to a second load. The system includes a converter for receiving a power of the first voltage from the first battery to convert the power of the first voltage into a power of the second voltage to supplied to the second battery. The system includes a controller for controlling output of the converter, in accordance with one of states of the generator, a charge of the first battery, the first load, a charge of the second battery, and the second load.

Preferably, the controller includes a decision maker for deciding the generator to be operated in one of a power mode and a regenerative mode. The power mode is for consuming a power. The regenerative mode is for regenerating a power. The controller controls the converter, based on decision of the decision maker.

Preferably, the controller controls the converter to output a predetermined current desired voltage value if the decision maker decides the generator in the power mode when the first battery is charged greater than a predetermined lower threshold.

Preferably, the controller controls the converter to lower a current desired voltage if the decision maker decides the generator in the power mode when the first battery is charged lower than the lower threshold.

Preferably, the controller controls the converter to keep a current desired voltage if the decision maker decides the generator in the power mode when the first battery is charged lower than the lower threshold.

Preferably, the controller controls the converter to keep a current desired voltage if the decision maker decides the generator in the regenerative mode when the first battery is charged lower than the lower threshold.

Preferably, the controller controls the converter to raise a current desired voltage if the decision circuit decides the generator in the regenerative mode when the first battery is charged greater than the lower threshold and the current desired voltage is lower than a maximum desired voltage.

Preferably, the controller controls the converter to keep a current desired voltage if the decision maker decides the generator in the regenerative mode when the first battery is charged greater than the lower threshold and the current desired voltage is greater than a maximum desired voltage.

A second aspect of the invention provides a power source system for a vehicle. The system includes a generator for producing a power. The system includes a first controller for controlling the generator. The system includes a first battery for being charged by the generator to supply a power of a first voltage to the first load. The system includes a second battery for supplying a power of a second voltage to a second load. The system includes a converter for receiving a power of the first voltage from the first battery to convert the power of the first voltage into a power of the second voltage to be supplied to the second battery. The system includes a second controller for controlling output of converter, in accordance with one of states of the generator, a charge of the first battery, the first load, a charge of the second battery, and the second load. The first controller is housed in a first connection box. The converter and the second controller are housed in a second connection box.

DETAILED DESCRIPTION OF THE PREFERRED EMBODIMENTS

Embodiments of the present invention will hereby be described with reference to the drawings.

First Embodiment

Figure 1:
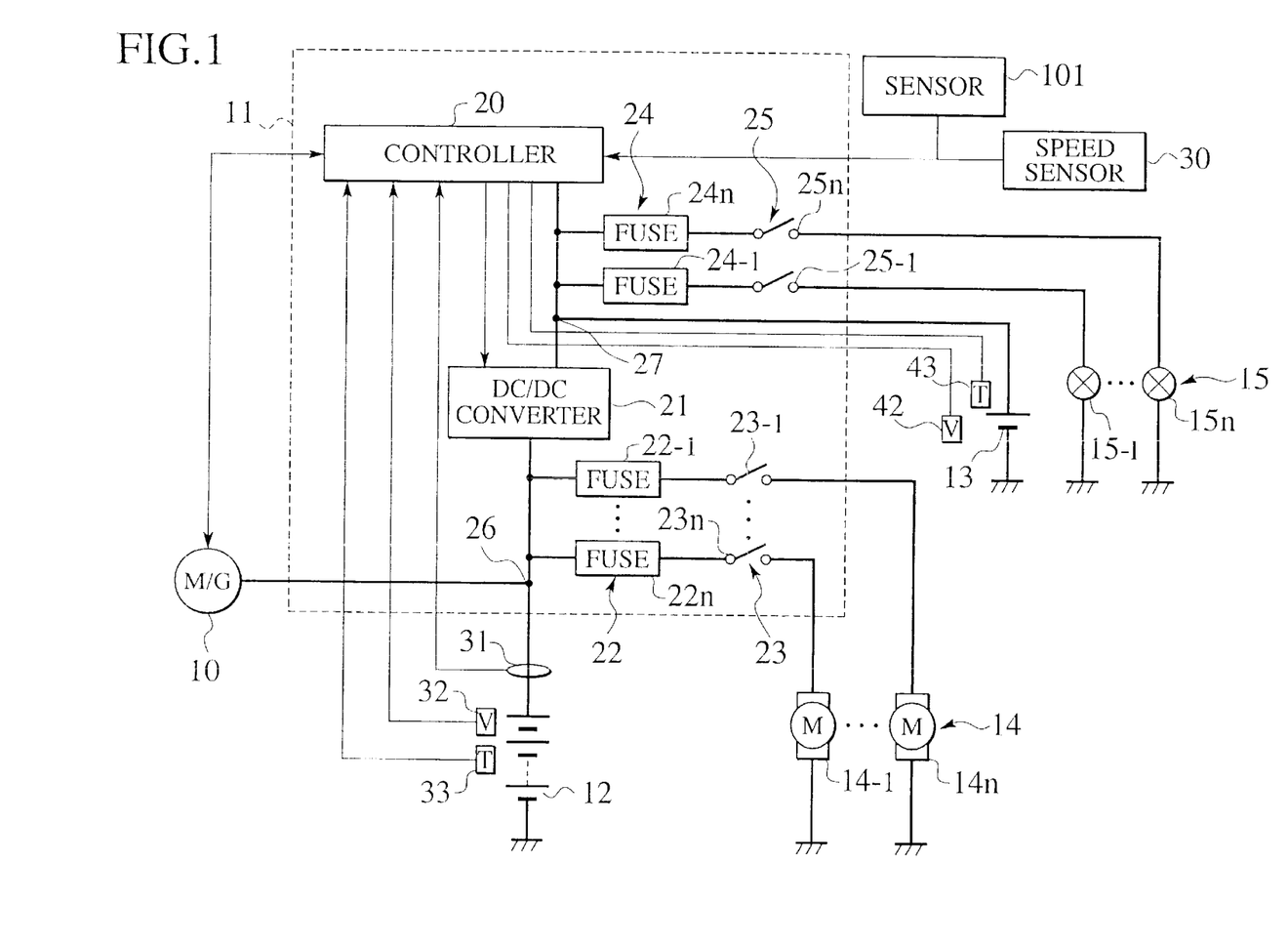
FIG. 1 is an illustrative block diagram of the power source system with constitution of the first embodiment according to the invention.

The power source system for a vehicle according to the first embodiment includes a connection box. The constitution of the power source system is illustrated in FIG. 1.

The power source system includes motor generator (M/G) 10, connection box 11, higher voltage battery 12, lower voltage battery 13, high voltage load 14-1 to 14n (as represented by reference character of 14 in the following), low voltage load 15-1 to 15n (as represented by reference character of 15 in the following).

Motor generator 10 as a generator of the invention operates in a power mode to consume an energy during acceleration, while operates in a regenerative mode to emit an energy during deceleration.

Motor generator 10 is driven by an engine with rotation (as not illustrated in Figs.) to produce a direct current power. The power is conducted to connection box 11. Motor generator 10 is controlled by control signals from controller 20 as specifically described below. A state signal represents motor generator 10 in a state, and is sent to controller 20.

Higher voltage battery 12 stores a power of a high voltage at, for example, 42 volt to be outputted. Battery 12 is charged by a direct current power of a high voltage which is conducted from generator 10 via connection box 11. Battery 12 outputs a power of a high voltage to be conducted to connection box 11.

Lower voltage battery 13 stores a power of a lower voltage at, for example, 12 V to be outputted. Battery 13 is charged by a direct current power of a low voltage which is conducted from connection box 11. Battery 13 outputs a power of a low voltage to be conducted to connection box 11.

High voltage loads 14 include motors to drive, for example, a wiper and a power window. Loads 14 are driven by a power of a high voltage which is supplied from connection box 11.

Low voltage loads 15 include, for example, a kind of lamps such as a headlight, a tail lamp, and a room lamp, and an ignition plug. Loads 15 are driven by a power of a low voltage which is supplied from connection box 11. Lower voltage battery 13 supplies a current to, for example, a lamp for a temporal rush current. Battery 13 is further employed to drive a radio or a kind of lamp which is used after ignition off.

Connection box 11 interconnects generator 10, higher voltage battery 12, lower voltage battery 13, high voltage load 14, and low voltage load 15. Connection box 11 houses controller 20, DC—DC converter 21, fuses 22-1 to 22n (as represented by reference character of 22 in the following), fuses 24-1 to 24n (as represented by reference character of 24 in the following), switch elements 23-1 to 23n (as represented by reference character of 23 in the following), and switch elements 25-1 to 25n (as represented by reference character of 25 in the following).

In the description as the following, the output terminal of generator 10, the input and output terminal of higher voltage battery, the input terminal of DC—DC converter 21 and the input and output terminals of fuses 22, are connected at junction point 26 in connection box 11, which is referred to as a high voltage current branch point 26. The output terminal of DC—DC converter 21, the input and output terminal of lower voltage battery 13, the power source input terminal of controller 20 and the input terminals of fuses 24 are connected at junction point 27 in connection box 11, which is referred to as low voltage current branch point 27.

Controller 20 corresponds to the controller of the invention, and includes, for example, a micro processor. The controller 20 includes a power source which is supplied from DC—DC converter 21 and lower voltage battery 13. Controller 20 is connected to generator 10, converter 21, control terminals of switch elements 23 and 25 (not illustrated in Figs.), speed sensor 30 of a vehicle, current sensor 31, voltage sensor 31, and temperature sensor 33.

Controller 20 controls the whole power source system. Controller 20 controls generator 10 to start or stop power generation, as control of a high voltage system. Controller 20 calculates a SOC (state of charge). The calculation is based on a condition of power generation of generator 10, on/off information of switch elements 23, 25, a consumption power of loads 14, 15, and signals. Switch elements 23 are connected to high voltage loads 14. Switch elements 25 are connected to low voltage loads 15. The signals are sent from speed sensor 30, current sensor 31, voltage sensor 32 and temperature sensor 33.

A desired voltage is determined in dependence on the result of calculation. In dependence on the desired voltage, the operation for voltage conversion of converter 21 is controlled as specifically described below. Controller 20 controls the opening or closing of switch elements 23 and 25, and the driving or stopping of high and low voltage loads 14 and 15. Controller 20 compares a practical output voltage relative to a desired voltage to execute a feed back control. Controller 20 monitors a vehicle speed with speed sensor 30 to control generator 10, which charges battery 12 with a regenerative energy that is produced by generator 10 during the deceleration.

Controller 20 controls converter 21 for control of the low voltage system, in addition to the control of the high voltage system.

Converter 21 corresponds to a voltage converter of the invention. Converter 21 includes an input terminal that is connected generator 10, battery 12 and fuses 22 via high voltage current branch point 26. Converter 21 includes an output terminal that are connected to battery 13, controller 20, fuses 24 via low voltage current branch point 27.

Converter 21 converts a high voltage (a direct current of 42 V) into a low voltage (a direct current of 12 V) to be outputted. The high voltage is supplied from generator 10 and battery 12. Converter 21 responds to a control signal from controller 20 to perform the voltage conversion operation.

Fuses 22 have input terminals connected to branch point 26. Fuses 22 have output terminals connected to the input terminals of switch elements 23. Switch elements 23 include output terminals connected to loads 14. Fuses 22 are fused to shut a current off when an overcurrent flow through loads 14. Control signals are send from controller 20 to be inputted on the control terminals of elements 23. Switch elements 23 respond to the control signals to open or close for controlling a direct current power of a high voltage to be supplied to loads 14 or not.

Fuses 24 include input terminals connected to branch point 27. Fuses 24 include output terminals connected to the input terminals of switch elements 25. Switch elements 25 include output terminals connected to loads 15. Fuses 24 are fused to shut a current off when an overcurrent flows through loads 15. Control signals are inputted on the control terminals of elements 25. Switch elements 25 respond to the control signals to open or close for controlling a direct current power of a low voltage to be supplied to loads 15 or not.

Speed sensor 30 detects the speed of a vehicle equipped with the power source. The detected result is sent to controller 20. Current sensor 31 is located in proximity to the input and output terminal of battery 12 to detect the magnitude of the current to be charged into battery 12. The detected current value is sent to controller 20.

Voltage sensor 32 is located in proximity to battery 12 to detect the magnitude of the output voltage of battery 12. The value of detected voltage is sent to controller 20. Temperature sensor 33 is located in proximity to battery 12 to detect a temperature of battery 12. The value of detected temperature is sent to controller 20.

The operation of the power source system is described with reference to the flow chart on FIG. 2. The following primarily describes the control of converter 21 by controller 20. The control is performed with a desired voltage setting routine which is called at a certain period in a stationary state.

When the ignition switch as not illustrated in Figs. is turned on, controller 20 sends the control signal to converter 21, thus to stop the operation. Next, controller 20 starts generator 10. This allows generator 10 to start electric power generation. Monitoring a signal of a state from generator 10, controller 20 stands by until the stable rotation of generator 10.

Under this stand-by condition, generator 10 and battery 12 output a direct current power of 42 volt to be supplied to the input terminal of converter 21 and to switch elements 23 through the fuses 22. In this case, if the output voltage is lower than a specified value, battery 12 is charged by a direct current power from generator 10.

Under the stand-by condition, when controller 20 decides generator 10 with stable rotation, it sends a control signal to converter 21, thus starting converter 21. Converter 21 responds to the control signal to start the voltage conversion operation. That is, converter 21 converts a high voltage of 42 volt inputted on the input terminal, into a low voltage of 12 volt to be outputted from the output terminal.

The direct current power of 12 volt is outputted from the converter 21 and battery 13 to be supplied to controller 20 and to the input terminals of switch elements 25 through fuses 24. In this case, the output voltage of battery 13 is lower than the specified value, battery 13 is charged by converter 21 with a direct current. This allows for the power source system in a stationary state.

The start of converter 21 in accordance with the above-described procedure reduces load on battery 12 at the start of generator 10.

When the converter 21 starts, a preferable control is that firstly, a low desired voltage is set as establishing the output voltage of converter 21 and, as time passes, a desired voltage is gradually increased. This avoids inconvenience due to a sharp variation of voltage.

Figure 2:
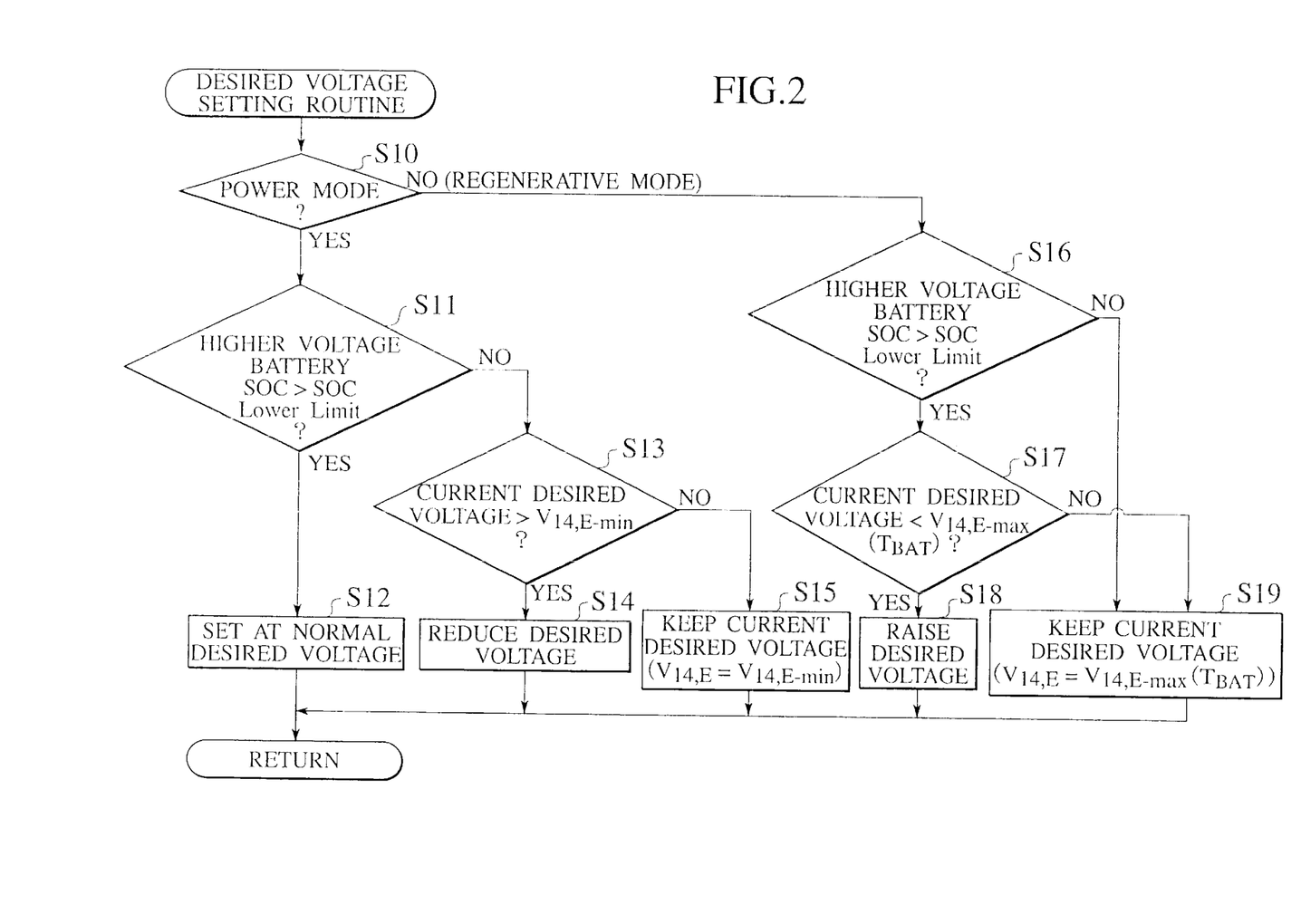
FIG. 2 is an illustrative flow chart of the operation on the power source system.

In the stationary state, as illustrated in FIG. 2, the controller 20 checks generator 10 in a power mode or not(step S10). The check is executed in accordance with a signal from a sensor 101, for example, as to whether the accelerator is pressed or not. The sensor 101 checks pressed accelerator in amount (not illustrated in Figs.). Whether the power mode is or not, may be decided in dependence on an SOC and a flow-in amount of current of battery 12.

When being decided in the power mode on the step S10, sequentially, whether the SOC of battery 12 or not is greater than the SOC lower limit (lower threshold of SOC) is checked (S11). When the SOC is decided greater than the lower limit, controller 20 identifies battery 12 in a normal state to set a normal desired voltage (step S12). In the process, in accordance with the temperature of battery 13 detected by temperature sensor 43, converter 21 is set at a predetermined desired voltage. When battery 13 supplies great power to loads 15, converter 21 is set at a slightly higher desired voltage to keep battery 13 from overdischage.

On the step S11, when the SOC of battery 12 is decided lower than the lower limit, controller 20 checks whether the current desired voltage is greater than the predetermined minimum desired voltage of V14, E-min (step S13) or not. When the current lower desired voltage is decided greater than the minimum desired voltage of V14, E-min, the process lowers the desired voltage (S14).

The lowering of a desired voltage of converter 21 reduces the charge current to battery 13 and the current to be supplied to low voltage loads 15. As a result, the consumption power in the low voltage system with converter 21 as one of high voltage loads, is substantially reduced. Most of current from generator 10 is used for charge of battery 12, or a discharge current from battery 12 is reduced.

On the step S13, when a current desired voltage is decided lower than the minimum desired voltage of V14, E-min, the control keeps the current desired voltage. No desired voltage lowers below the minimum limit desired voltage of V14, E-min. The overdischarge from battery 13 or the interference with the operation of loads 15 such as reduction of luminance of a lamp, does not occur.

When a current desired voltage becomes lower than the minimum limit desired voltage of V14, E-min, controller 20 may send a control signal to generator 10, thus increasing production of power. In cooperation with the control of output voltage of converter 21, the charge or discharge of battery 13 is effectively controlled.

On the step S10, when being decided out of the power mode, a regenerative mode is identified. Next, whether an SOC of battery 12 is greater than the lower limit or not is checked (step S16). When the SOC is decided lower than the lower limit of SOC, the control keeps a desired voltage (step S19). This allows battery 12 to be positively charged.

On the step S16, when an SOC of battery 12 is decided greater than the lower limit, a current desired voltage is checked lower or not than a predetermined maximum desired voltage of V14, E-max (T-BAT) that depends on a temperature of battery 13 (step S17).

When the current desired voltage is decided lower than the maximum desired voltage of V14, E-max (T-BAT), the process raises a desired voltage (step S18). Controller 20 raises converter 21 in a desired voltage to take an energy at maximum that is regenerated by generator 10.

This process of raising a desired voltage allows a power to be positively taken into battery 13. Controller 20 controls generator 10 to keep a charge power per a certain time of battery 12 under an allowable charge power and to keep battery 12 from overcharge.

In the regeneration mode, the storing of a power in battery 12 by converter 21 allows the power stored in battery 13 to be applied to later power consumption. This reduces loads on battery 12 and generator 10, thus increasing the effect on improvement of fuel costs.

On the step S17, a current desired voltage is decided greater than the highest desired voltage of V14, E-max (T-BAT), the control keeps the current desired voltage (step S19). This allows a desired voltage to be kept under the maximum desired voltage of V14, E-max (T-BAT), thus preventing the overcharge of battery 13.

On the steps S14 and S18, when a desired voltage is changed, in order to keep with the low voltage system from inconvenience, a desired voltage is preferably gradually varied as time passes. The inconvenience is that a sharp variation of a desired voltage causes a sharp variation of luminance of a lamp.

Second Embodiment

Figure 3:
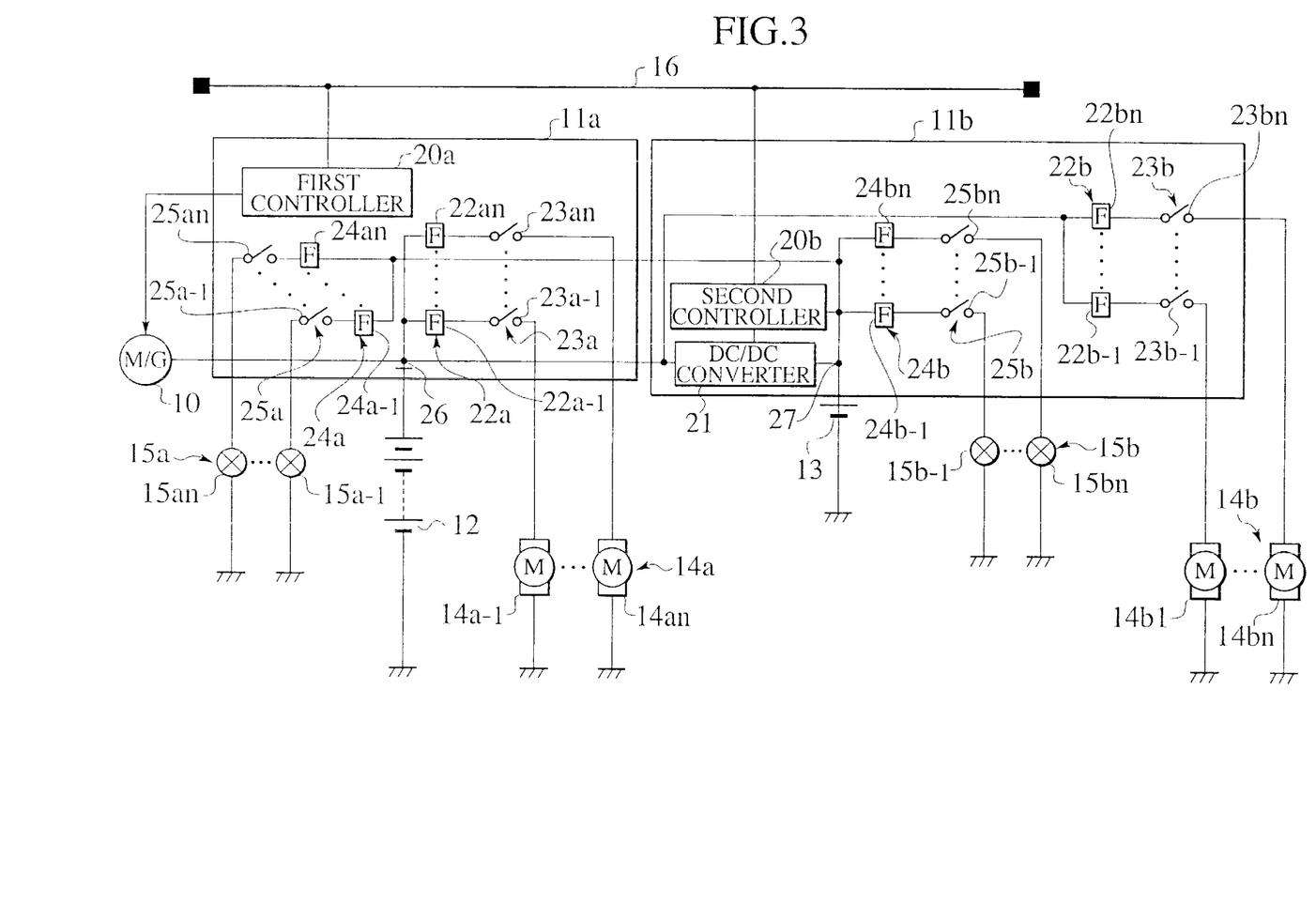
FIG. 3 is an illustrative flow chart of operation of the power source system according to the second embodiment of the invention.

The power source system according to the second embodiment of the invention is described. The power source system includes two connection boxes as illustrated in FIG. 3.

The power source system includes motor generator (M/G) 10; first connection box 11a; second connection box 11b; higher voltage battery 12; lower voltage battery 13; first high voltage loads 14a-1 to 14an (as represented by reference character of 14a in the following); second high voltage loads 14b-1 to 14bn (as represented by reference character of 14b in the following); first low voltage load 15a-1 to 15an (as represented by reference character of 15a in the following); second voltage load 15b-1 to 15bn (as represented by reference character of 15b in the following); and bus 16.

Generator 10 is identical to one of the first embodiment. Generator 10 produces a direct current power, which is sent to first connection box 11a and to second connection box 11b through the first connection box 11a. Generator 10 is controlled by first controller 20a (as specifically described below) with a control signal in first connection box 11a. A state signal, which represents a state of generator 10, is sent to first controller 20a.

Higher voltage battery 12 is identical to one of the first embodiment. Battery 12 is charged by a direct current power of a high voltage which is conducted from generator 10 via connection box 11a. Battery 12 produces a power of a high voltage to be conducted to connection box 11a.

Lower voltage battery 13 is identical to one of the first embodiment. Battery 13 is charged by a direct current power of a low voltage which is conducted from connection box 11b. Battery 13 produces a power of a low voltage to be conducted to connection box 11b.

First and second loads 14a and 14b include a motor which drives, for example, a wiper or a power window. First loads 14a is driven by a power of a high voltage which is supplied from first connection box 11a. Second loads 14b is driven by a power of a high voltage which is supplied from second connection box 11b. These first and second loads 14a and 14b correspond to high voltage load 14 of the first embodiment.

First and second low voltage loads 15a and 15b include, for example, a kind of lamp such as a head light, a tail lamp, or a room light; and an ignition plug. First loads 15a are driven by a power of a low voltage which is supplied from first connection box 11a. Second loads 15b are driven by a power of a low voltage which is supplied from second connection box 11b. These first and second loads 15a and 15b correspond to low voltage loads 15 of the first embodiment.

First connection box 11a interconnects generator 10, battery 12, first high voltage loads 14a, first low voltage loads 15a, and second connection box 11b. First connection box 11a houses first controller 20a; fuses 22a-1 to 22an (as represented by reference character of 22a in the following); fuses 24a-1 to 24an (as represented by reference character of 24a in the following); switch elements 23a1 to 23an (as represented by reference character of 23a in the following); switch elements 25a1 to 25an (as represented by reference character of 25a in the following).

Second connection box 11b interconnects battery 13, second loads 14b, and first connection box 11a. Second connection box 11b houses: second controller 20b; fuses 22b-1 to 22bn (as represented by reference character of 22b in the following); fuses 24b-1 to 24bn (as represented by reference character of 24b in the following); switch elements 23b1 to 23bn (as represented by reference character of 23b in the following); and switch elements 25b-1 to 25bn (as represented by reference character of 25b in the following).

Fuses 22a and 22b correspond to fuses 22 of the first embodiment. Fuses 24a and 24b correspond to fuses 24 of the first embodiment. Switch elements 23a and 23b correspond to switch elements 23 of the first embodiment. Switch elements 25a and 25b correspond to switch elements 25 of the first embodiment.

In the following description, the output terminal of generator 10, the input and output terminal of battery 12, the input and output terminal of DC—DC converter 21, and input terminals of fuses 22a are connected at junction point 26 in first connection box 11a, which is referred to as high voltage current branch point 26. The output terminal of converter 21, the input and output terminal of battery 13, the power source input terminal of second controller 20b, and the input and output terminals of fuses 24b are connected at junction point 27 in second connection box 11b, which is referred to as low voltage current branch point 27.

First controller 20a corresponds to the first controller of the invention. First controller 20a includes, for example, a micro processor. First controller 20a has a power source which is supplied by converter 21 and battery 13 through a path (as omitted in Figs.). First controller 20a is connected to generator 10, bus 16, and the control terminals (as not illustrated in Figs.) of switch elements 23a and 25a. First controller 20a is connected to a speed sensor of a vehicle, a current sensor, a voltage sensor, and a temperature sensor (as omitted in Figs.). First controller 20a primarily controls generator 10 to be started or stopped.

First controller 20a controls the opening or closing of switch elements 23a and 25a. Controller 20a controls the driving and stopping of first loads 14a and 15a. First controller 20a monitors a speed by the use of the speed sensor. Controller 20a controls the charging of battery 12, by the use of a regenerative energy which generator 10 produces during deceleration.

Second controller 20b corresponds to the second controller of the invention. Controller 20b includes, for example, a micro processor. Second controller 20b has a power source which is supplied from converter 21 and battery 13. Controller 20b is connected to converter 21 and the control terminals (not illustrated) of switch elements 23b and 25b.

Second controller 20b calculates an SOC on the basis of information which is obtained by each element of second connection box 11b and which is sent from first connection box 11a via bus 16. The information of second connection box 11b includes on/off information of switch elements 23b that are connected to second loads 14b. The information includes a consumption power of second loads 14b. The information includes on/off information of switch elements 25b which are connected to second loads 15b. The information includes a consumption power of second loads 15b.

The information is sent from first controller 20a of first connection box 11a via bus 16. The information includes a power generation state of generator 10. The information includes: on/off information of switch elements 23a connected to first loads 14a; and a consumption power generation of first loads 14a. The information includes on/off information of switch elements 25a connected to first loads 15a; and a consumption power of first loads 15a. The information includes signals from the speed sensor, the current sensor, the voltage sensor, and the temperature sensor.

The desired voltage is determined in dependence on the calculated SOC. In dependence on the desired voltage, converter 21 is controlled on the voltage conversion operation. Second controller 20b controls the opening or closing of switch elements 23b and 25b and the driving or stopping of second load 14b and second load 15b. In addition, second controller 20b compares a practical output voltage relative to a desired voltage to execute a feed back control.

Converter 21 corresponds to the voltage converter of the invention. Converter 21 includes a input terminal, which is connected to generator 10, battery 12 and fuses 22a via branch point 26 in first connection box 11a, and to fuses 22b in second connection box 11b. Converter 21 has an output terminal, which is connected to battery 13, second controller 20b and fuses 24b via branch point 27 in the second connection box 11b, and to fuses 24a and first controller 20a (connection lines omitted in Fig.) in first connection box 11a. Converter 21 has the constitution and operation identical to the first embodiment.

In first connection box 11a, fuses 22a include input terminals which are connected to branch point 26. Fuses 22a include output terminals, which are connected to input terminals of switch elements 23a. Switch elements 23a include output terminals which are connected to first loads 14a. Fuses 22a are fused to shut a current off when an overcurrent flows through first loads 14a. Switch elements 23a have control terminals for inputting control signals from first controller 20a. Fuses 22a respond to the control signals to be opened or closed, and control whether a direct current of a high voltage is supplied to first loads 14a.

In first connection box 11a, fuses 24a include input terminals, which are connected to branch point 27 in the second connection box 11b. Switch elements 25a include output terminals, which are connected to first loads 15a. Fuses 24a are fused to shut a current off when an overcurrent flows through first loads 15a. Switch elements 25a have control terminals for inputting control signals from first controller 20a. Switch elements 25a respond to the control signals to be opened or closed, and control whether a direct current of a low voltage is supplied to first loads 15a or not.

In second connection box 11b, fuses 24b have input terminals, which are connected to branch point 27. Fuses 24b include output terminals connected to the input terminals of switch elements 25b. Switch elements 25b include the output terminals connected to second loads 15b. Fuses 24b are fused to shut a current off when an overcurrent flows through second loads 15b. Switch elements 25b include the control terminals for inputting control signals from second controllers 20b. Switch elements 25b respond to the control signals to be opened or closed, and control whether a direct current of a low voltage is supplied to second loads 15b or not.

In second connection box 11b, fuses 22b have input terminals which are connected to branch point 26. Fuses 22b include output terminals which are connected to the input terminals of switch elements 23b. Switch elements 23b include output terminals which are connected to second loads 14b. Fuses 22b are fused to shut a current off when an overcurrent flows through second loads 14b. Switch elements 23b include the control terminals for inputting control signals from second controllers 20b. Switch elements 23b responds to the control signals to be opened or closed, and control whether a direct current of a high voltage is supplied to second loads 14b or not. A speed sensor, a current sensor, a voltage sensor, and a temperature sensor as omitted in Figs. are identical to ones of the first embodiment.

The power source system according to the second embodiment has the operation identical to the first embodiment, excepting that the communication of first controller 20a in the first connection box 11a and second controller 20b with each other through bus 16 functions as controller 20 of the first embodiment.

First controller 20a in first connection box 11a produces an information of a power mode or a regenerative mode at present, to be sent to second controller 20b in second connection box 11b. Second controller 20b receives the information to identify an operational state of generator 10, thus determining a desired voltage of converter 21. The procedure of determination on the desired voltage is identical to one of the first embodiment.

At the start, first controller 20a monitors generator 10 and battery 12 to send a start command of converter 21 to second connection box 11b after stable operation of generator 10. This allows generator 10 to be started without load on battery 12 at the start.

According to the power source system of the second embodiment, first connection box 11a, housing first controller 20a, and second connection box 11b, housing converter 21 and second controller 20b, are separated from each other. The separation allows a degree of freedom on arrangement of connection boxes in position to be increased, thus simplifying a power source system in design.

In the second embodiment, while first and second controllers 20a and 20b communicate with each other through bus 16, first and second controllers 20a and 20b may be directly connected with each other by one-to-one.

According to the invention, the output of the voltage converter is controlled, depending on the states of the generator, the charge of the battery of a higher voltage, the charge of the battery of a lower voltage, and the low voltage load. The generator and the voltage converter are cooperatively operated to control power generation in amount in accordance with various conditions of a vehicle. Thus, the control of generator in amount of power generation further improves fuel costs and effective protection of batteries.

The output of the voltage converter is separately controlled in a respective power mode or a regenerative mode. The control allows high and low voltage batteries to be optimized in charge and discharge in accordance with a condition of a vehicle.

When the higher voltage battery has a normal charged state larger than the lower limit, the voltage converter is controlled to output a predetermined desired voltage in a power mode, thus normally outputting a preferable voltage.

When the higher voltage battery has less voltage than the lower limit in the power mode under an abnormal state, the voltage converter is controlled to lower a current desired voltage. The control reduced consumption power of the low voltage load. Most of a current outputted from the generator charges the higher voltage battery. A discharge current from the high voltage battery is reduced. The result allows the high voltage battery to be efficiently charged.

When the high voltage battery has a charge state lower than the lower limit under an abnormal state in a power mode, the voltage converter is controlled to keep the current desired voltage, thus preventing interference with operation of the low voltage load.

The higher voltage battery is positively charged.

The regeneration of a current with the generator in a regenerative mode allows the lower voltage battery to be charged under a maximum desired voltage, thus compensating the lower voltage load for power consumption. The result reduces load on the higher voltage battery and the generator, thus improving fuel costs.

When the higher voltage battery has a charge state greater than the maximum desired voltage, the voltage converter is controlled to keep the current desired voltage. The control prevents the lower voltage battery from overcharge.

Connection boxes, housing a first controller and a second controller respectively, are separated from each other. The separation increases the connection boxes in a degree of freedom on arrangement, and simplifies a power source system for a vehicle in design.

The entire contents of Japanese Patent Applications P2001-180079(filed on Jun. 14, 2001) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A power source system for a vehicle comprising:
   a generator for producing a power;
   a first battery for being charged by the generator to supply a power of a first voltage to a first load;
   a second battery for supplying a power of a second voltage to a second load;
   a converter for receiving a power of the first voltage from the first battery to convert the power of the first voltage into a power of the second voltage to be supplied to the second battery; and
   a controller for controlling output of the converter, in accordance with one of states of the generator, a charge of the first battery, the first load, a charge of the second battery, and the second load.

2. The power source system according to claim 1,
   wherein the controller comprises a decision maker for deciding the generator to be operated in one of a power mode and a regenerative mode, the power mode for consuming a power, the regenerative mode for regenerating a power,
   wherein the controller controls the converter, based on decision of the decision maker.

3. The power source system according to claim 2,
   wherein the controller controls the converter to output a predetermined current desired voltage value if the decision maker decides the generator in the power mode when the first battery is charged greater than a predetermined lower threshold.

4. The power source system according to claim 2,
   wherein the controller controls the converter to lower a current desired voltage if the decision maker decides the generator in the power mode when the first battery is charged lower than the lower threshold.

5. The power source system according to claim 4,
   wherein the controller controls the converter to keep a current desired voltage if the decision maker decides the generator in the power mode when the first battery is charged lower than the lower threshold.

6. The power source system according to claim 2,
   wherein the controller controls the converter to keep a current desired voltage if the decision maker decides the generator in the regenerative mode when the first battery is charged lower than the lower threshold.

7. The power source system according to claim 2,
   wherein the controller controls the converter to raise a current desired voltage if the decision circuit decides the generator in the regenerative mode when the first battery is charged greater than the lower threshold and the current desired voltage is lower than a maximum desired voltage.

8. The power source system according to claim 2,
   wherein the controller controls the converter to keep a current desired voltage if the decision maker decides the generator in the regenerative mode when the first battery is charged greater than the lower threshold and the current desired voltage is greater than a maximum desired voltage.

9. A power source system for a vehicle comprising:
   a generator for producing a power;
   a first controller for controlling the generator;
   a first battery for being charged by the generator to supply a power of a first voltage to the first load;
   a second battery for supplying a power of a second voltage to a second load;
   a converter for receiving a power of the first voltage from the first battery to convert the power of the first voltage into a power of the second voltage to be supplied to the second battery; and
   a second controller for controlling output of converter, in accordance with one of states of the generator, a charge of the first battery, the first load, a charge of the second battery, and the second load,
   wherein the first controller is housed in a first connection box, and
   wherein the converter and the second controller are housed in a second connection box.

* * * * *